United States Patent

Berstis et al.

[11] Patent Number: 6,115,371
[45] Date of Patent: Sep. 5, 2000

[54] SATELLITE UPLINK SEPARATION USING TIME MULTIPLEXED GLOBAL POSITIONING SYSTEM CELL LOCATION BEACON SYSTEM

[75] Inventors: Viktors Berstis, Austin; Joel Leslie Smith, Round Rock, both of Tex.

[73] Assignee: International Business Machines Corporation, Armonk, N.Y.

[21] Appl. No.: 09/239,337

[22] Filed: Jan. 28, 1999

[51] Int. Cl.[7] ............................. H04J 3/00; H04B 7/212; H04B 7/185; G01S 5/02

[52] U.S. Cl. ........................ 370/345; 342/357.1; 370/347

[58] Field of Search ..................... 342/357.1; 370/345, 370/346, 347, 348; 445/450

[56] References Cited

U.S. PATENT DOCUMENTS 5,365,451  11/1994  Wang et al ........................... 342/357.1

Primary Examiner—Thomas H. Tarcza
Assistant Examiner—Fred H. Mull
Attorney, Agent, or Firm—Jeffrey S. LaBaw

[57] ABSTRACT

A method for allocating bandwidth to devices seeking to initiate contact with a communication service is described. At each device, the location of the device is determined via a global positioning system calculation. At each device, a cell corresponding to the determined location is determined. At each device, a message for service to the communication service is sent at a time slice allocated for the cell. Upon receiving notification of service, allocated bandwidth and frequency by the communication service, communication is established.

23 Claims, 4 Drawing Sheets

SATELLITE UPLINK SEPARATION USING TIME MULTIPLEXED GLOBAL POSITIONING SYSTEM CELL LOCATION BEACON SYSTEM

BACKGROUND OF THE INVENTION

This invention relates generally to determining position by electromagnetic radiation. More particularly, the invention relates to an improved system for determining a time period in which to make initial contact with a communications system based on the position of the user.

As the world becomes a more crowded and busy place, the use of radio bandwidth has correspondingly become more crowded. Furthermore, more devices in the hands of more people attempt to make contact with a variety of communication services such as cell phones and satellite uplinked communication services. This has resulted in the increased likelihood of "collisions", that is, several individuals attempt to establish initial contact with a service at the same time. While a need has been recognized to manage the increased traffic levels in a more efficient manner to allow the greatest use of the available bandwidth, most of these schemes are available only once the initial contact has been made with the service. Until service has been established, and bandwidth assigned to the user, each device must continually request service until recognized. As one can imagine, the repetitious requests for service further constrain the already crowded bandwidth and diminish the likelihood that any one request will be immediately fulfilled by the communication service.

The inventors propose a system in which the time slot in which the initial contact with a communication service is governed by the user's position. The Global Positioning System (GPS) is currently the most precise positioning system generally available to the general public and has significantly dropped in price in recent years. The GPS comprises a network of 24 satellites orbiting the earth. Each satellite transmits a ranging signal modulated on a 1.575 Ghz carrier. By monitoring the signal from a plurality of satellites, a GPS receiver can determine its position, i.e. latitude, longitude and altitude, to an accuracy of about 15–100 meters. In general, a GPS receiver can accurately determine its position if signals from three or four of the GPS satellites can be received. More accurate signals are available to the military. Differential GPS, also available to the public, is more accurate than standard GPS, but requires an additional land based transmitter and special permission from the government.

Many of the uses for GPS-based systems proposed are in the realm of mapping or collision avoidance applications. Notably one such GPS-based system is taught by "Traffic Alert and Collision Avoidance Coding System", U.S. Pat. No. 5,636,123 to Rich et al. In the Rich system, the airspace is divided up into a grid of volume elements. A collision avoidance signal is transmitted wherein the carrier signal is modulated by a psuedonoise code which is function of the volume element in which the aircraft is located. Each aircraft only tracks collision avoidance signals from vehicles in its own and immediate surrounding cells. Based on the calculated paths of the aircraft, a warning of an impending collision can be provided to the pilot.

The Applicants have proposed an improved tracking and collision avoidance system in "Time Multiplexed Global Positioning System Cell Location Beam System" Ser. No. 09/239,335, Attorney Docket No. AT9-98-870 filed the same day as the present application, is commonly assigned and is hereby incorporated by reference. Although the invention described in the incorporated application does not address the problems of reducing radio traffic and improving the likelihood that an initial contact with a communication service will be successful, it does share an overall cell structure with the present invention.

This invention solves these and other important problems.

SUMMARY OF THE INVENTION

A method for allocating bandwidth to devices seeking to initiate contact with a communication service is described. At each device, the location of the device is determined via a global positioning system calculation. At each device, a cell corresponding to the determined location is determined. At each device, a message for service to the communication service is sent at a time slice allocated for the cell. Upon receiving notification of service, allocated bandwidth and frequency by the communication service, communication is established.

BRIEF DESCRIPTION OF THE DRAWINGS

The foregoing features, advantages and aspects of the invention will be better understood with reference to following detailed description which describes the accompanying drawings wherein.

DETAILED DESCRIPTION OF THE DRAWINGS

As mentioned above, many vehicles such as automobiles, aircraft and boats have GPS receivers. It expected that a family of personal data assistants (PDAs) and smart phones will also have GPS devices integrated therein. The Time Multiplexed GPS based Cell Location Beacon System (hereinafter "TCELL") proposed by this invention makes use of the GPS receiver for determining the location of such a smart to avoid transmission collisions in time.

Figure 1:
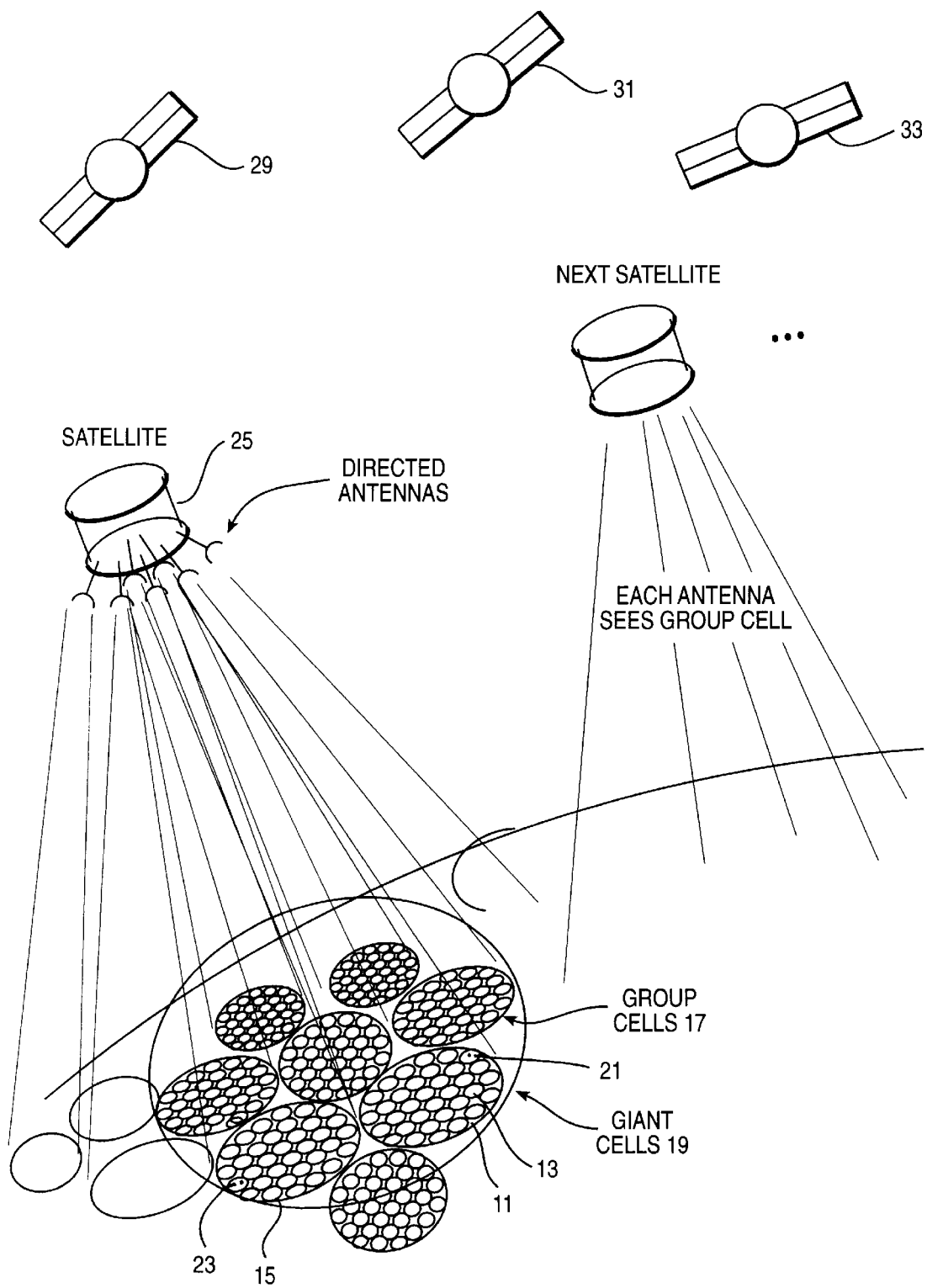
FIG. 1 is a pictorial view of a plurality of devices operating on the surface of the earth which has been partitioned into a hierarchy of cells according to present invention and a satellite with which the devices are attempting to establish communication.

The embodiment shown in FIG. 1 shows a portion of the earth's surface divided into a hierarchically organized set of cells. In this illustration, the cells are shown as circular. However, the surface can be divided into any shape which can be tightly packed, i.e. there is no space which is not allocated to a cell. Also, for ease of illustration, only a limited portion of the earth's surface is shown. However, the TCELL system installed in each device could contain information relating to a large area, preferably the entire surface of the earth.

The first level of the hierarchy is called a "minicell". As shown in FIG. 1, minicells 11, 13, 15, for example, having radius R1, are relatively small and measured in one to a few hundreds of feet. The aim in constructing the size of the minicell is to have a single or minimum number of devices in a minicell. By minimizing the number of devices in a cell, potential collisions in transmission are avoided. As the devices are moved by their users, they continually determine their position via GPS and determine which minicell they are in by reference to a minicell directory or formula.

The next level of the hierarchy is called a "group cell". A circular collection of minicells forms a group cell 17, having radius R2. The group cell diameter is used to segment the giant cell into usable frequency blocks. The number of minicells within a respective group cell will depend therefore on the size of the minicell and the number of frequencies used by the TCELL transmitters in the giant cell.

The highest level is called a "giant cell" 19. A group cell and all of its immediate neighbors forms a giant cell with a radius of at approximately 3*R2. The size of the giant cell is chosen to make the reception of calls from the minicells selective, i.e. calls from neighboring giant cells are not received. In the diagram, the each giant cell is comprised of 7 group cells, although this can differ depending on the base shape used for the cells. Further, the base shape for the minicell can be different from that used for the group and giant cells. Within each giant cell, each minicell is linearly enumerated and mapped onto a small time slice in an n second repeating unit of time exactly specified by the GPS clock. The small time slice is at least the amount of time that light would propagate between the furthest and nearest minicells within giant plus the amount of time it takes to transmit packet of data. As part of its programming, the satellite knows the transmission delay for the various minicell locations and can account for the delays during reception.

Thus, the minicell in which the device finds itself determines when the device is allowed to transmit to the communication service. It is worthwhile to note that respective minicells within different giant cells will transmit at the same GPS time. However, because of attenuation, speed of light effects and/or frequency use respective communication service receivers will not be confused or overwhelmed. The directional antennas on the satellite will help prevent it from picking up signals from neighboring giant cells.

As shown, each device 21, 23 receives a GPS signal from three (or more) GPS satellites 29, 31 and 33. They also have a transmitter capable of transmitting a signal approximately to the satellite 25 offering the communication service. If service is desired, the transmitter sends a burst of data during the time slice and on the frequency determined by its location, i.e. which minicell the device is located.

As will be appreciated by the skilled practitioner, there is a balancing act between the size of the minicell which is a factor of the device characteristics as well as the number of minicells in giant cell. The size of the minicell is also strongly influenced by the delta in propagation time for the TCELL signal from different locations across a giant cell and the number of channels used by TCELL system. Each minicell within a given giant cell is allotted a time slice of an overall repeating time period. The time slice must be large enough for each transmitter to transmit the required information and allow the signal to propagate the diameter of a giant cell. Where multiple frequencies are used, the time slices allocated to each frequency are independent of, although comparable in duration to the time slices allocated for any other frequency. In the multiple frequency case, minicells within the same giant cell will use the same time slice on different frequencies. Therefore, there can not be too many minicells within a giant cell.

One skilled in the art will appreciate that operating parameters can vary as will be shown in some alternative embodiments below. However, for a preferred embodiment in which devices transmit at a frequency of 10 GHz, with each group cell using a different frequency, an appropriate minicell size is 100 meters in diameter in a city environment. In rural areas since the devices are fewer in number, the minicell size can be increased to 1000 meters in diameter. The group cell size is close to 17 miles in diameter and the giant cell size is 50 miles in diameter. This translates into 100,000 in the group cell, 700,000 minicells being in a giant cell in a city area.

Figuring a periodicity of 3 seconds between time slices for a particular device, this allows 30 microseconds for each transmitter to send a 152 bit message on one of 7 channels. Within its allotted time slot, each device can transmit the request for communication service according to the protocol of the service. After the device has successfully contacted the satellite offering the service, the service will move the device onto another frequency band and allot time slices according to whatever multiplexing protocol is used by normal communication. There are many solutions in the prior art for time and frequency multiplexing of signals for many stations within a communication network. Any of these could be used by the service during the normal communication phase.

In other embodiments of the invention, separation of signal by having devices within a given giant cells transmit at different frequencies is unnecessary if the size of the giant cell and number of minicells therein is relatively small.

The reader will note that the invention may be described in terms of listening, selecting, comparing, determining or other terms that could be associated with a human operator. The reader should remember that the operations which form the invention are machine operations processing electrical signals to generate other electrical signals.

Figure 2:
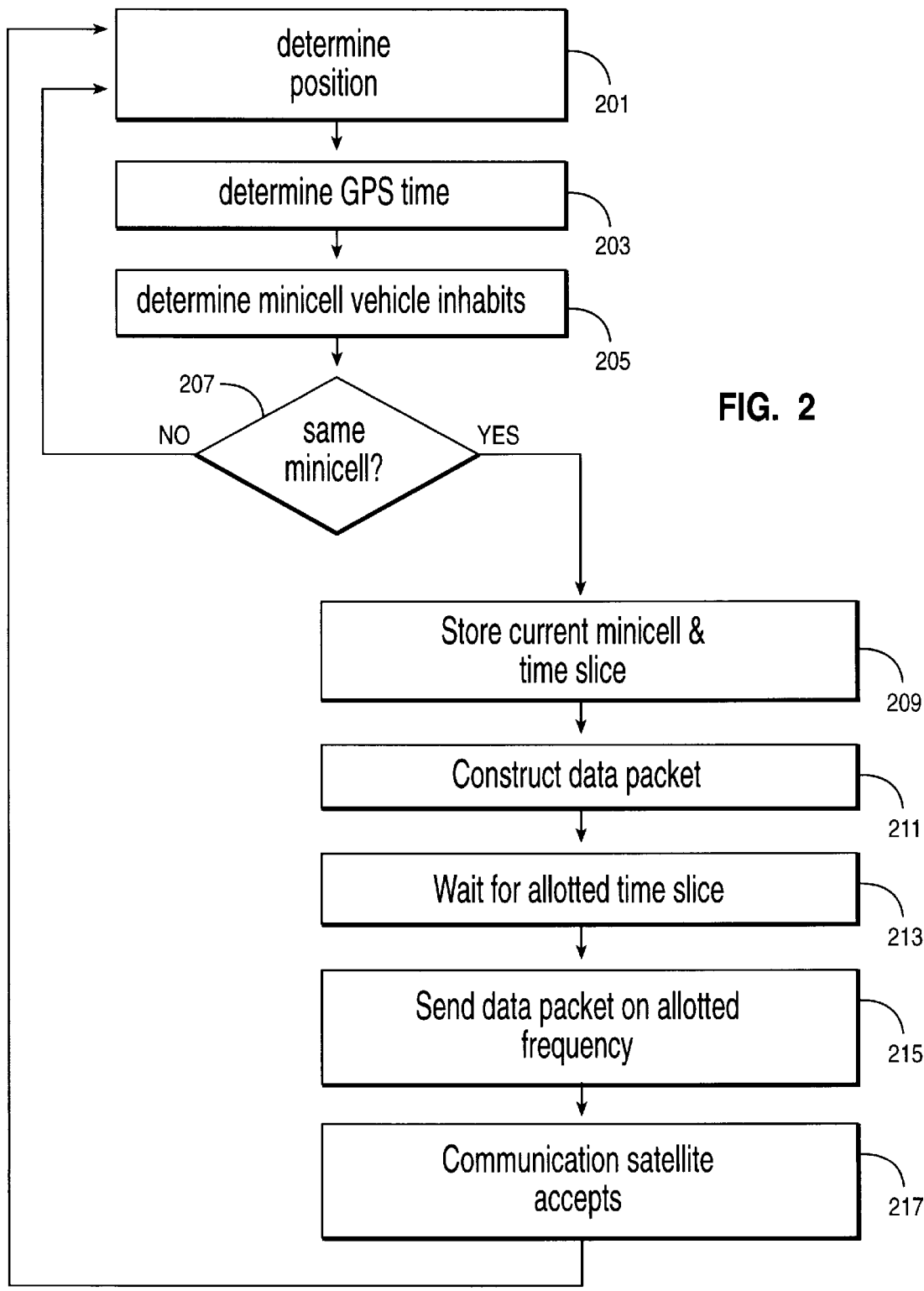
FIG. 2 is a flow diagram for establishing the right by one of the devices to transmit to a communication service according to the present invention.

In FIG. 2, a flow diagram of the procedure for a TCELL equipped device located at a respective vehicle. The procedures for each device are similar; they can vary according to cell size, time slice and assigned frequency, but are otherwise similar. In step 201, the TCELL system in the vehicle determines its position, e.g., latitude, longitude and altitude using a GPS receiver. If a differential GPS system is used, high accuracy is usually attained which may be useful in crowded city conditions. At step 203, the TCELL system determines the GPS time as defined by the signal received from the GPS satellites. At step 205, the TCELL system determines which minicell it is in by reference to the minicell directory or minicell formula and its calculated position. Preferably, the minicell directory and formula are an integral parts of the TCELL system. However, to save storage requirements in the device the directory can be omitted. In a TCELL system where the size of the minicells varies, the satellite or other central authority can transmit to (not shown) the devices' information about the minicell size in its area. Using the minicell size as an input to the minicell formula, the proper minicell can be calculated. From the minicell directory or formula, the TCELL system would determine the time slice and frequency in which it was allowed to transmit.

In step 207, a test is performed to determine whether the calculated minicell varies from the last calculated minicell by a predetermined amount. In general, the device should be in the same or a proximate minicell from the last reading. If the minicell varies by more than the predetermined amount, the process cycles back to confirm the reading. In step 209, the current minicell and time slice are stored.

In step 211, the message is constructed for the request for service is constructed. The message comprises data as required by the communications service such as device ID and type, frequency capabilities, or whatever data the designers of the communications service protocol deem useful. At step 213, the TCELL transmitter waits until its allotted time slice occurs. At step 215, the TCELL message is sent during the allotted time slice for the minicell. At step 217, the satellite returns a message to the device indicating that service is available and enters a negotiation phase wherein the frequencies and time slices are assigned to the device for normal communication. The process returns to step 201 where the device position is updated according to the signals received by the GPS receiver.

The preceding flow diagram assumes that the minicell grid has been designed so that only one device which is presently requesting service is present in a given minicell. It is possible that more than one device in a minicell will request service at particular time. While the division of the earth's surface has greatly reduced the chance of collisions, they are still possible. As a refinement to the basic invention, the process in FIG. 2 can be preceded by a negotiation among the devices located in a given minicell, perhaps in an ordered round-robin using the device serial numbers and a hashing scheme which initially separates the signals during this negotiation to determine which of the devices has the right to contact the communication service first. This negotiation can be performed prior to any attempt to contact the communication service, or in response to failure to contact the satellite. Failure to contact the satellite can be an indication that more than one device is attempting to initiate service at once. As an alternative to negotiation, after the failure to contact the service within a given number of consecutive time slices, e.g., two, the device will next attempt communication at a pseudo random number of time slices in the future. If the period between time slices is short enough, the user should not encounter and intolerable delay. Further, since the design of the minicells makes a collision in the first place unlikely, the perceived service on average through the devices is greatly improved.

Figure 3:
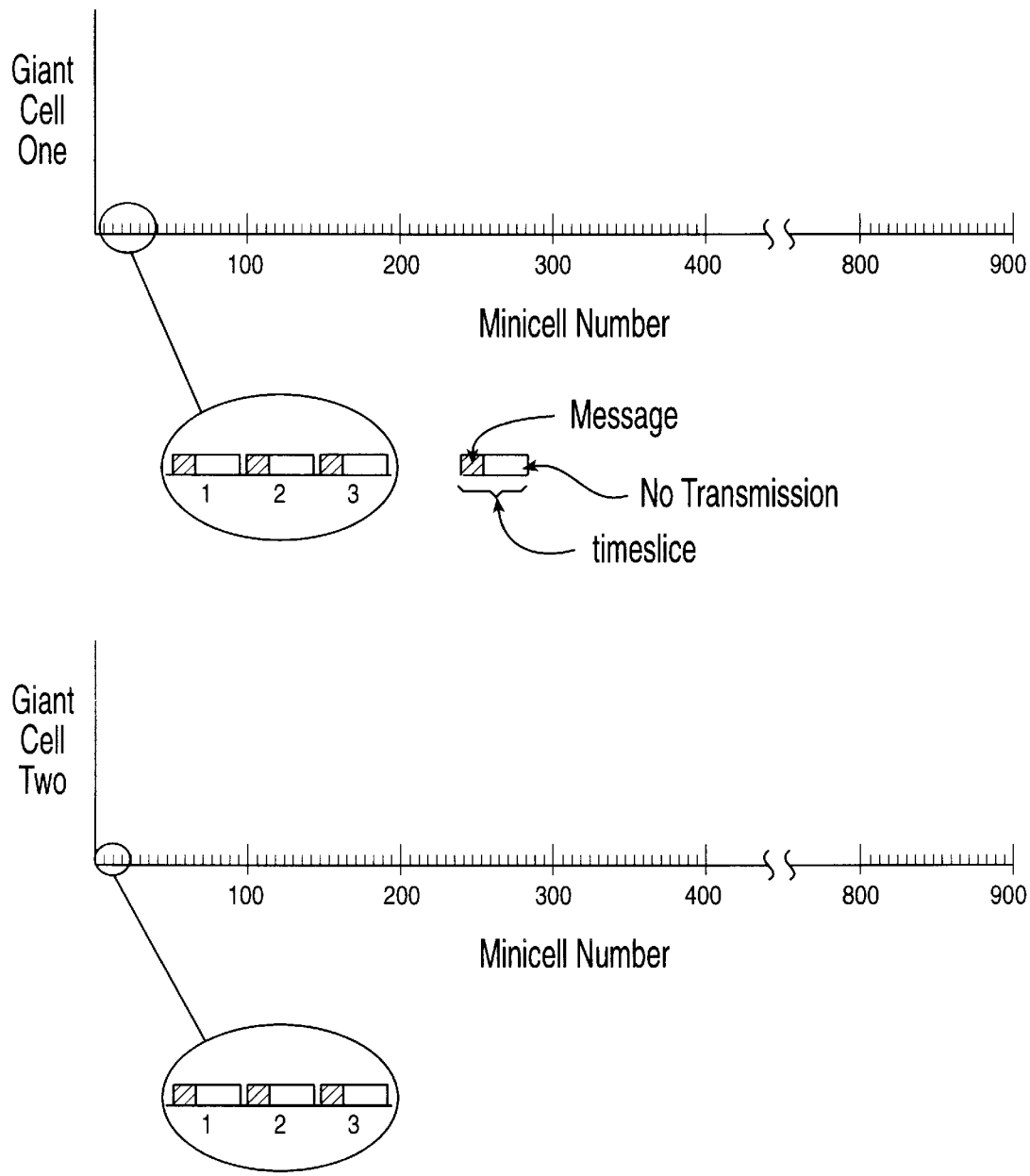
FIG. 3 is a diagram showing the allotted time slices for respective minicells within a two dimensional hierarchy.

FIG. 3 shows the allotted time slices for two adjacent giant cells. Each giant cell contains 900 minicells which for the sake of illustration are allotted time slices in numeric order on a single frequency. However, as those skilled in the art would recognize other orders and addition frequencies are possible. The reader can imagine that each giant cell contains nine group cells arranged in a two dimensional plane each of which contains 100 minicells. Within each giant cell, the group cell to the northwest contains minicells 1–100 numbered left to right, the group cell due north contains minicells 101–200, the group cell to the northeast contains minicells 201–300 and so forth. Minicell 1 in giant cell 1 has the same time slice as minicell 1 in giant cell 2 and so forth.

Although not illustrated, the transmitters in each group cell could use one of nine different frequencies so that the interval between each time slice allotted to a minicell can be reduced. In this case, within each giant cell, minicells 1, 101, 201, 301, 401, 501, 601, 701, 801 and 901 would transmit during the same time slice albeit at different frequencies.

Figure 4:
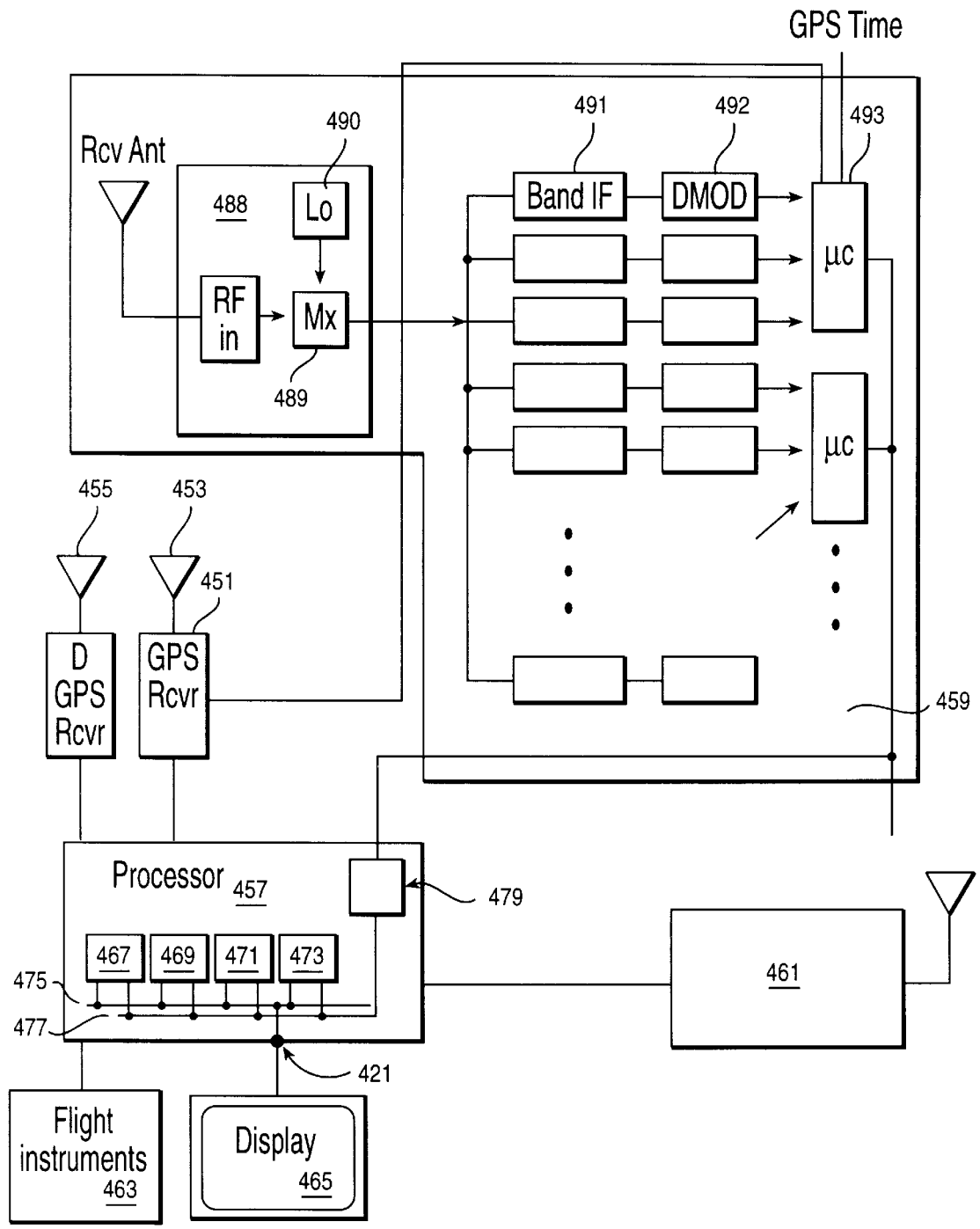
FIG. 4 is a block diagram of the TCELL system suitable for a device attempting to connect with a communications service.

FIG. 4 is a block diagram of the TCELL system within the device. As shown in the figure, a GPS receiver 451 includes GPS antenna 453 and possibly a differential GPS antenna 455 and a differential GPS receiver 456 is coupled to the TCELL processor 457. The GPS receiver 451 and TCELL processor 457 communicate position and time information. The TCELL processor 457 is in turn coupled to the device processor 459 and its transmitter 461.

The TCELL processor 457 comprises a microprocessor 467, a RAM and/or ROM 469, a persistent memory 471 and a timer circuit 473 all coupled to and communicating via a data bus 475 and an address bus 477. Communication with the TCELL receiver 459 and the device processor 461 is accomplished by means of a serial I/O interface 479. The timer circuit 473 which keeps track of the time slots and is fed the time data from the GPS receiver 451.

The RAM 469 contains the TCELL program 483, cell directory and/or formula 485 during execution. The TCELL program 483 receives the data from the GPS receiver and other possibly other inputs, analyzes the data, and instructs the device processor when to send the message requesting the initiation of service.

In a multiple frequency embodiment, the TCELL receiver has a front end 488 with a mixer 489 and a local oscillator 490 which picks up a band of frequencies, e.g., a 200 MHz bandwidth. Assuming that there are 20 channels, each channel has a tuner, a bandwidth IF 491, which is tuned to a respective 10 MHz band. This is coupled to a demodulator 492 which is in turn coupled to a microcontroller 493. Each microcontroller 493 processes the TCELL signals received on the channel for use by the TCELL processor 457.

As described above, the preferred embodiments of the invention are a system programmed to execute the method or methods described herein, the methods themselves and a computer program product. The sets of instructions which comprise the computer program product are resident in a random access memory of one or more systems as described generally above during execution. Until execution, the sets of instructions can be stored in another type of memory such as flash memory, hard disk or CD-ROM memory. Furthermore, the sets of instructions can be stored in the memory of another computer and transmitted to the system when desired by a wired or wireless network transmission medium. The physical storage or transmission of the sets of instructions change the medium in which they are resident. The change may be electrical, magnetic, chemical or some other physical change.

While the present invention, its features and advantages have been described with reference to certain illustrative embodiments, those skilled in the art would understand that various modifications, substitutions and alterations can be made without departing from the scope and spirit of the invention. Therefore, the invention should be not construed as being narrower than the appended claims.

We claim:

1. A method for allocating bandwidth to devices seeking to initiate contact with a communication service, comprising the steps of:

at each device, determining a location of the device via a global positioning system calculation;

at each device, determining a cell corresponding to the determined location, wherein respective adjacent cells are allocated different time slices to initiate contact with the communication service;

at each device, broadcasting a request for initiation of service to the communication service at a time slice allocated for the cell; and receiving notification of service, allocated bandwidth and frequency by the communication service.

2. The method as recited in claim 1, wherein the step of determining a cell is accomplished by the use of a cell directory stored at a device.

3. The method as recited in claim 1, wherein the step of determining a cell is accomplished by the use of a cell formula stored at a device.

4. The method as recited in claim 1, wherein each cell is a member of a giant cell.

5. The method as recited in claim 4, wherein each cell within a respective giant cell is allocated a different time slice to initiate contact with the communication service.

6. The method as recited in claim 4, wherein cells within a respective giant cells are assigned a respective one of a plurality of frequencies and each cell within a respective giant cell on a respective frequency is allotted a different time slice to initiate contact with the communication service.

7. The method as recited in claim 4, wherein the size of cells in a densely populated area is smaller than the size of cells in a sparsely populated area.

8. The method as recited in claim 4, wherein a duration of a time slice is at least the time required to transmit the request for service and the time required for the request to propagate over a diameter of the giant cell.

9. The method as recited in claim 4, wherein devices in the same cell negotiate between each other for use of the time allocated to the cell to initiate contact with the communication service.

10. The product as recited in claim 4, wherein devices in the same cell negotiate between each other for use of the time allocated to the cell to initiate contact with the communication service.

11. The method as recited in claim 1, wherein each device moves into a different frequency band for normal service than a frequency band used to initiate contact with the communication service.

12. The method as recited in claim 1, further comprising the step of responsive to a failure to initiate contact with the communication service, using an alternate procedure to initiate contact with the communication service.

13. A network of devices which allocates bandwidth to devices seeking to initiate contact with a communication service, comprising:
   at each device, means for determining a location of the device via a global positioning system calculation;
   at each device, means for determining a cell corresponding to the determined location , wherein respective adjacent cells are allocated different time slices to initiate contact with the communication service;
   at each device, means for broadcasting a request for initiation of service to the communication service at a time slice allocated for the cell; and
   at each device, means for receiving notification of service, allocated bandwidth and frequency by the communication service.

14. The network as recited in claim 2, wherein the means for determining a cell uses a cell directory stored at a device.

15. The network as recited in claim 2, wherein each cell is a member of a giant cell.

16. The network as recited in claim 15, wherein each cell within a respective giant cell is allocated a different time slice to initiate contact with the communication service.

17. The network as recited in claim 15, wherein the size of cells in a densely populated area is smaller than the size of cells in a sparsely populated area.

18. The network as recited in claim 2, wherein each device moves into a different frequency band for normal service than a frequency band used to initiate contact with the communication service.

19. A computer program product in a computer readable medium for allocating bandwidth to devices seeking to initiate contact with a communication service, comprising:
   for a respective device, means for determining a location of a device via a global positioning system calculation;
   for the respective device, means for determining a cell corresponding to the determined location, wherein respective adjacent cells are allocated different time slices to initiate contact with the communication service;
   for the respective device, means for broadcasting a request for initiation of service to the communication service at a time slice allocated for the cell; and
   for the respective device, means for receiving notification of service, allocated bandwidth and frequency by the communication service.

20. The product as recited in claim 19, wherein the means for determining a cell uses a cell formula stored at a device.

21. The product as recited in claim 19, wherein each cell is a member of a giant cell and each cell within a respective giant cell is allocated a different time slice to initiate contact with the communication service.

22. The product as recited in claim 21, wherein a duration of a time slice is at least the time required to transmit the request for service and the time required for the request to propagate over a diameter of the giant cell.

23. The product as recited in claim 19, wherein each device moves into a different frequency band for normal service than a frequency band used to initiate contact with the communication service.

* * * * *